US006893002B2

(12) United States Patent
Brice et al.

(10) Patent No.: US 6,893,002 B2
(45) Date of Patent: May 17, 2005

(54) LOCKOUT VALVE

(75) Inventors: Lawrence E. Brice, Armada, MI (US); John A. Kempf, Clarkston, MI (US)

(73) Assignee: Master Pneumatic-Detroit, Inc., Sterling Heights, MI (US)

( * ) Notice: Subject to any disclaimer, the term of this patent is extended or adjusted under 35 U.S.C. 154(b) by 33 days.

(21) Appl. No.: 10/691,202

(22) Filed: Oct. 22, 2003

(65) Prior Publication Data

US 2004/0079916 A1 Apr. 29, 2004

Related U.S. Application Data

(60) Provisional application No. 60/420,204, filed on Oct. 22, 2002.

(51) Int. Cl.[7] .................................................. F16K 3/00
(52) U.S. Cl. ........................ 251/206; 251/327; 137/383
(58) Field of Search ................................. 251/206, 326, 251/327; 137/383

(56) References Cited

U.S. PATENT DOCUMENTS

| | | | | |
|---|---|---|---|---|
| 1,921,298 | A | * 8/1933 | Lewis | ........................... 138/45 |
| 2,601,304 | A | * 6/1952 | Lanc | ........................... 251/199 |
| 3,294,112 | A | * 12/1966 | Watkins | ....................... 137/494 |
| 3,575,377 | A | * 4/1971 | Carlton et al. | .............. 251/176 |
| 4,065,106 | A | * 12/1977 | Althausen et al. | ........ 366/159.1 |
| 4,446,887 | A | * 5/1984 | Redmon et al. | ............. 137/556 |
| 5,148,829 | A | * 9/1992 | Deville | ......................... 137/486 |
| 6,010,115 | A | * 1/2000 | Schlegel et al. | ............. 251/327 |
| 6,116,278 | A | 9/2000 | Baumgardner et al. | 137/625.25 |
| 6,375,157 | B1 | * 4/2002 | Van de Lande | ............. 251/327 |
| 6,422,535 | B1 | * 7/2002 | Stone et al. | ................. 251/327 |

* cited by examiner

*Primary Examiner*—J. Casimer Jacyna
(74) *Attorney, Agent, or Firm*—Gifford, Krass, Groh, Sprinkle, Anderson & Citkowski, P.C.

(57) ABSTRACT

A lockout valve is provided having a valve body with an inlet conduit, a central chamber and an outlet conduit, to form a continuous passageway. The lockout valve also includes a slide mechanism slidingly disposed in valve slide channel to operatively control fluid flow through the passageway between an open position, an intermediate position and a closed position. The slide mechanism includes a plurality of flow apertures to restrict flow through the passageway. The front side of the slide mechanism includes a detent slot and the back side of the slide mechanism includes a longitudinally extending override slot having an upper portion positioned opposite the detent slot to form a continuous opening, and a lower portion that does not form a continuous opening. The valve further includes a detent mechanism for overriding the intermediate position of the slide mechanism including a detent override lever with a finger member extending from an edge of the detent override lever. The detent mechanism also a ball member positioned between the spring and the detent override lever within a housing recess. The ball travels through the detent slot concurrent with the slide mechanism sliding through the valve slide channel until the ball reaches a bottom edge of the detent slot. Actuation of the detent override lever engages the override finger within the override slot to push the ball into the recessed area of the housing so that the slide mechanism bypasses the intermediate position.

24 Claims, 4 Drawing Sheets

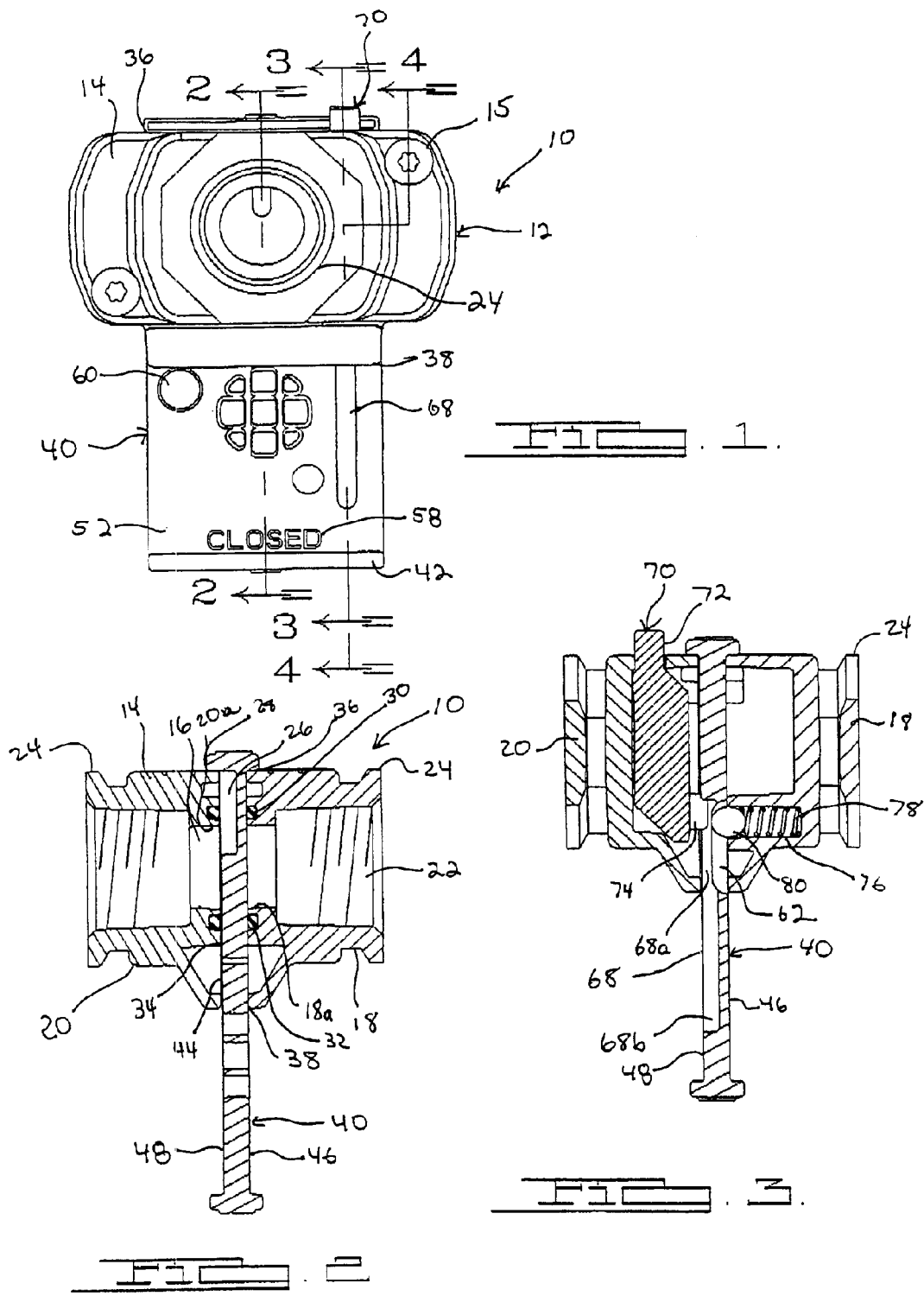

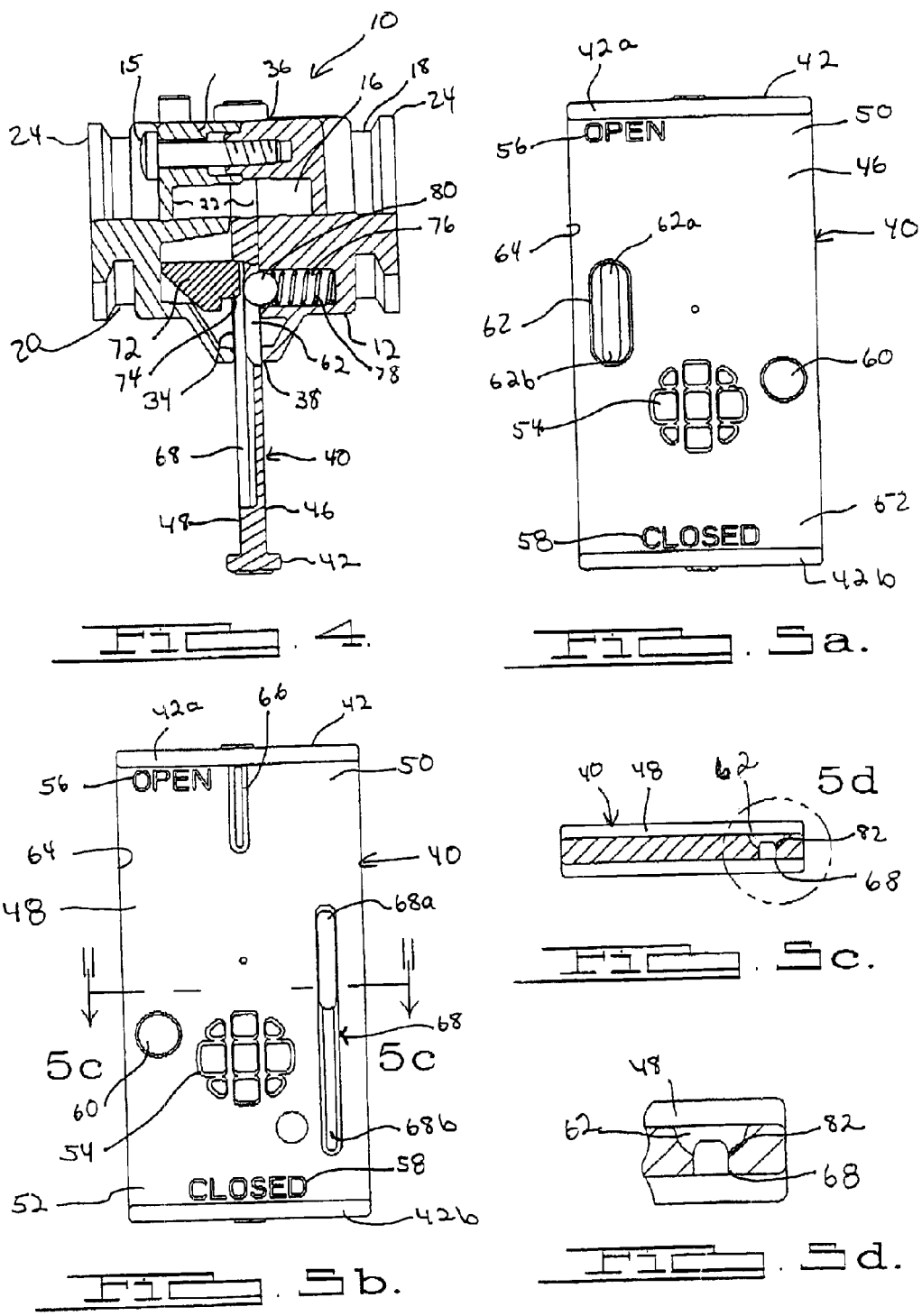

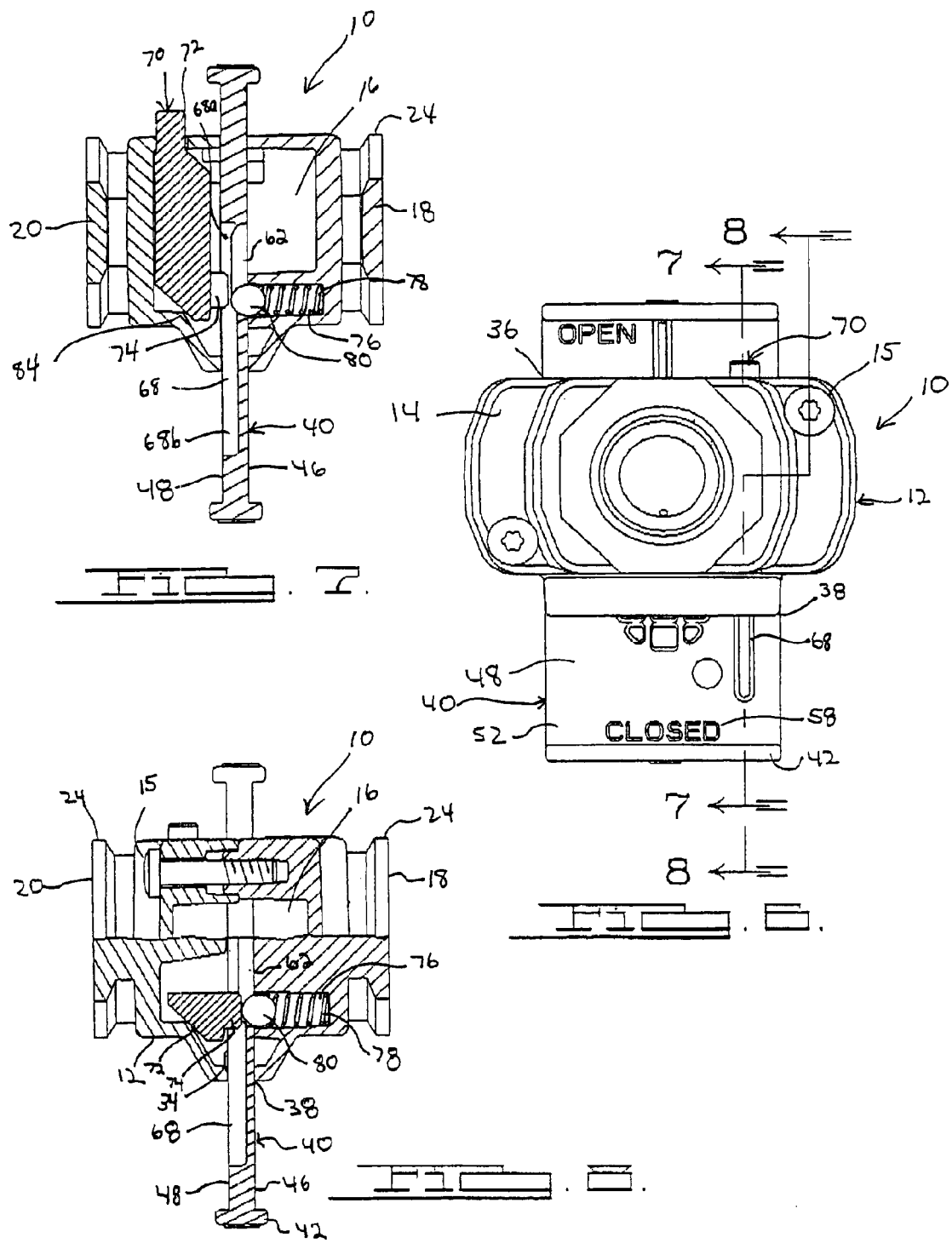

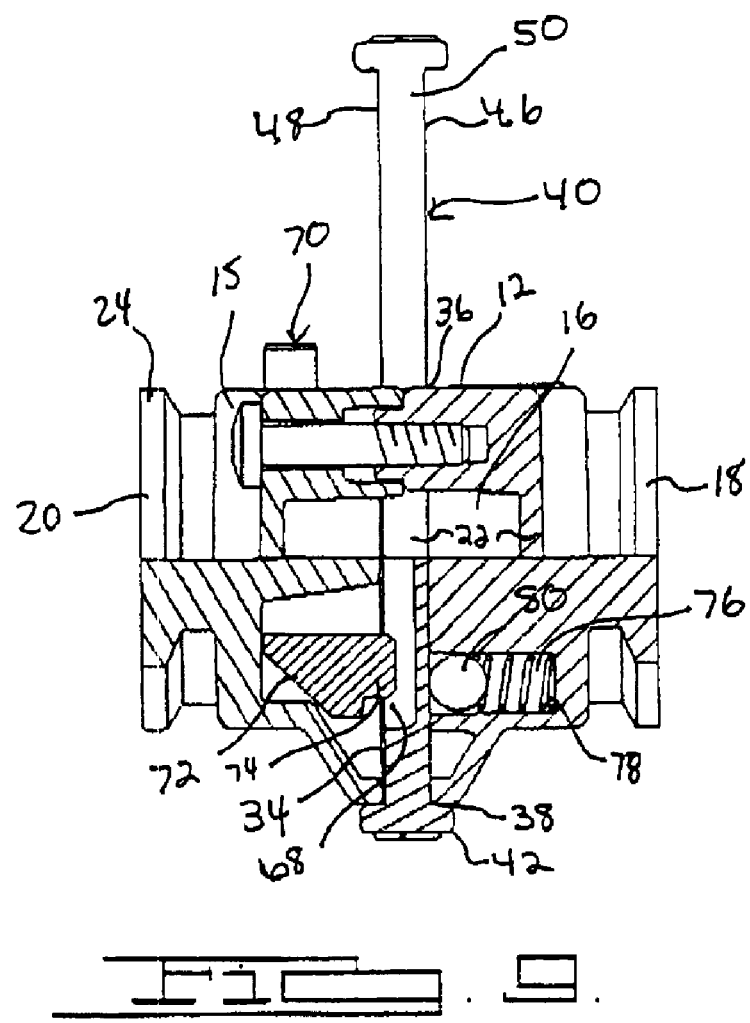

LOCKOUT VALVE

RELATED APPLICATION

This application claims priority of U.S. Provisional Patent Application Ser. No. 60/420,204 filed Oct. 22, 2002, which is incorporated herein by reference.

BACKGROUND OF THE INVENTION

1. Field of the Invention

The present invention relates generally to a pneumatic valve and, more specifically, to a lockout valve that controls fluid flow in a fluid system.

2. Description of the Related Art

Various types of fluid systems are known in the art that rely on the fluid flow of pressurized air. An example of a fluid system is a pneumatic system. These types of fluid systems periodically need maintenance, which requires careful control of the air flow supply to the system, as well as control of the air flow already within the system. Various types of valves are well known in the art for controlling the flow of fluid in a fluid system.

For example, a type of valve referred to as a lockout valve typically includes a slide mechanism that is positionable to control the fluid flow passing through the valve. The lockout valve provides for predetermined levels of flow, such as fully open, fully closed and an intermediate, partial flow, position. The slide mechanism is positioned in the open position when one hundred percent fluid flow is desirable. The slide mechanism is positioned in the closed position when zero percent fluid flow is desirable. The slide mechanism may be locked in this position using an external locking mechanism, such as a padlock, to prevent the unintended movement of the slide mechanism. The slide mechanism may be positioned in an intermediate, or bleed position, to provide partial flow through the valve. This position is advantageous when restricted flow is desirable until the pressure within the system equalizes. It should be appreciated that certain types of equipment may be damaged by rapid changes in air pressure.

One example of a lockout valve that provides for a gradual buildup of pressure across the valve in an open position to protect other components within the system, is disclosed in U.S. patent application Ser. No. 6,116,278 to Baumgardner et al., which is herein incorporated by reference. While the valve disclosed by Baumgardner et al. '278 works well, it utilizes a lever on the slide to maintain the position of the slide in an intermediate position, and does not provide for overriding of the intermediate position. Thus there is a need in the art for a lockout valve having an override mechanism that bypasses the intermediate position, to go directly from a closed valve to an open valve position to control the fluid flow therethrough.

SUMMARY OF THE INVENTION

Accordingly, the present invention is an improved lockout valve. A lockout valve is provided having a valve body with an inlet conduit to a central chamber and an outlet conduit from the central chamber, to form a continuous passageway. The valve body also includes a valve slide channel extending transversely therethrough the housing between an upper opening in an upper end of the housing and a lower opening in a lower end of the housing. The lockout valve also includes a slide mechanism slidingly disposed in the valve slide channel to operatively control fluid flow through the passageway between an open position, an intermediate position and a closed position. The slide mechanism is generally planar and includes an upper end and a lower end, each having a radially extending flange and two side edges extending therebetween the upper end and the lower end. A front side of the flange faces the inlet conduit and a back side faces the outlet conduit. The slide mechanism includes a plurality of flow apertures extending therethrough the slide mechanism and arranged in a predetermined pattern to restrict flow through the passageway. The front side of the slide mechanism includes a detent slot having a predetermined length, width and depth. The back side of the slide mechanism includes a longitudinally extending override slot having an upper portion with a predetermined length, width and depth positioned opposite the detent slot to form a continuous opening, and having a lower portion with a predetermined length, width and depth that does not form a continuous opening. The valve further includes a detent mechanism for overriding the intermediate position of the slide mechanism, which includes a detent override lever partially disposed in the housing with a finger member extending from an edge of the detent override lever within the housing. The detent mechanism also includes a spring member located in a recess in the housing and a ball member located in the housing recess, such that the ball member is positioned between the spring and the detent override lever. A ball is located in the upper portion of the detent slot when the slide mechanism is in a closed position and travels through the detent slot concurrent with the slide mechanism sliding through the valve slide channel until the ball reaches a bottom edge of the detent slot. Actuation of the detent override lever engages the override finger within the lower end of the back side override slot to push the ball into the recessed area of the housing, so that the slide mechanism bypasses the intermediate position in traveling between the closed.

One advantage of the present invention is that a lockout valve is provided for efficiently managing fluid flow within a fluid system. Another advantage of the present invention is that a lockout valve is provided that is cost-effective to manufacture. Still another advantage of the present invention is that a lockout valve is provided that provides for actuation between a closed valve flow position and an open valve flow position without stopping at an intermediate valve flow position.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a lockout valve with a slide mechanism in a closed position, according to the present invention.

FIG. 2 is an elevational sectional view along line 2—2 of the lock-out valve of FIG. 1, according to the present invention.

FIG. 3 is an elevational sectional view along line 3—3 of the lockout valve of FIG. 1, according to the present invention.

FIG. 4 is an elevational sectional view along line 4—4 of the lockout valve of FIG. 1, according to the present invention.

FIG. 5a is an elevational view of the front side of the slide mechanism, according to the present invention.

FIG. 5b is an elevational view of the back side of the slide mechanism, according to the present invention.

FIG. 5c is a sectional side view along line 5c of FIG. 5b of the override slot, according to the present invention.

FIG. 5d is a detailed sectional view of the bottom stop for the override slot, according to the present invention.

FIG. 6 is an elevational view of the lockout valve of FIG. 1 with the slide mechanism in an intermediate position, according to the present invention.

FIG. 7 is an elevational sectional view along line 6—6 of the lockout valve of FIG. 6, according to the present invention.

FIG. 8 is an elevational sectional view along line 8—8 of the lockout valve of FIG. 6, according to the present invention.

FIG. 9 is an elevational sectional view of the lockout valve of FIG. 1 with the slide mechanism in an open position, according to the present invention.

DESCRIPTION OF THE PREFERRED EMBODIMENT(S)

Referring to FIGS. 1–9, a lockout valve 10 is illustrated. The lockout valve 10 includes a valve body 12 having a housing 14 that defines a central chamber 16. It should be appreciated that the valve body 12 may include two identical housing members 14 joined together to define the central chamber 16. It should be appreciated that the two halves of the housing 14 may be held together using a fastening means 15, such as a screw. The valve body 12 includes an inlet conduit 18 to the central chamber 16 and an outlet conduit 20 from the central chamber 16. The inlet conduit 18 and outlet conduit 20 may be integrally formed as part of the valve body housing 14. The inlet conduit 18, central chamber 16 and outlet conduit 20 jointly form a passageway 22 for directing the flow of fluid through the valve body 12. The valve body 12 is preferably manufactured using a known metal material and a known metal-forming technique, such as casting or stamping, or the like.

An outer end of each of the inlet conduit and the outlet conduit includes a connecting means 24 for connecting the valve 10 to another component (not shown), such as a machine. An example of a connecting means 24 is a threaded connection. It should be appreciated that the valve 10 may be used to interconnect two components.

The valve body 12 includes at least one vent passageway 26 extending transversely between the central chamber 16 and a vent outlet opening 28 formed in the housing 14 of the valve body 12. The vent outlet opening 28 provides for finer control of fluid flow through the passageway 22 by bleeding of air from the central chamber 16 to the atmosphere, for example, to exhaust downstream air from the passageway 22.

The valve 10 also includes at least one sealing mechanism 30, such as an o-ring, for sealing around an inner end 18a of the inlet conduit 18 or an inner end 20a of the outlet conduit 20. The o-ring 30 is preferably disposed in an annular channel 32. In this example, the annular channel 32 is formed in an inside surface of the housing 14 surrounding an inner end 18a of the inlet conduit 18 and an inner end 20a of the outlet conduit 20, respectively.

The valve body further defines a valve slide channel 34 extending transversely between an upper opening 36 formed in an upper end of the housing 14, and a lower opening 38 formed in a lower end of the housing 14.

The lockout valve 10 includes a slide mechanism 40 which is slidingly disposed within the valve slide channel 34, and extending out beyond the upper opening 36 in the upper end of the housing 14 and the lower opening 38 in the lower end of the housing 14. As illustrated in FIGS. 5a–5d, the slide mechanism 40 is a generally planar member. In this example the slide mechanism is rectangular in shape. The slide mechanism controls the fluid flow through the valve passageway 22. In FIGS. 1–4, the slide mechanism 40 is in a closed position, so that no fluid flows through the passageway 22. In FIGS. 6–8, the slide mechanism is in an intermediate position, restricting the flow of fluid through the valve in a manner to be described. In FIG. 9, the slide is in an open position, allowing the flow of fluid through the valve.

The slide mechanism 40 includes an upper end and a lower end, with each having a radially extending flange 42 forming a "T" shape. The upper flange 42a and lower flange 42b each provide a stop to limit and control travel of the slide mechanism 40 within the slide channel 34. Preferably, a transversely extending groove 44 is formed in the slide channel 34 for receiving an edge of the slide mechanism 40 and positively guiding its movement therethrough the slide channel 34 in a manner to be described.

The slide mechanism includes a front side as shown in FIG. 5a at 46 that is distinguishable from a back side as shown in FIG. 5b at 48. Preferably, the front side 46 of the slide mechanism faces the inlet conduit 18 in an installed position. Also, an open end 50 or a closed end 52 is exposed in an open position or closed position of the valve 10 respectively. The front side 46 includes a plurality of flow apertures 54 or gates arranged in a predetermined pattern and located in a predetermined location, extending between the front side 46 and back side 48 of the slide mechanism 40. In this example the flow gates 54 are positioned nearer the closed end 52 and are arranged in a circular pattern. It should be appreciated that the flow gates 54 are positioned to provide for the restricted flow of fluid between the inlet conduit and the outlet conduit when the slide mechanism is in an intermediate position.

The slide mechanism 40 may include indicia or writing on the front side 46 or back side 48, such as the words "open" 56 or "closed" 58, to provide a visual indicator to a user whether the valve 10 is open or closed. The indicia may be molded in the slide mechanism 40 or a label or the like that is affixed to the slide mechanism 40. The slide mechanism 40 further includes a lockout aperture 60. In this example the lockout aperture 60 is positioned adjacent the flow gates 54. An external locking mechanism (not shown), such as a padlock, may be disposed in the lockout aperture 60, to prevent inadvertent movement of the slide mechanism 40 through the valve body 12, such as when the slide mechanism 40 is in a closed position.

The front side 46 of the slide mechanism 40 also includes a longitudinally extending detent slot 62, for a purpose to be described. In this example, the detent slot 62 is positioned halfway between the open end 50 and closed end 52, and near an outer edge 64 of the slide mechanism 40. The detent slot 62 is of a predetermined length, width and depth.

The back side 48 of the slide mechanism 40 includes the flow gates 54 and lockout aperture 60 as previously described. The back side of the slide mechanism also includes an exhaust slot 66 extending longitudinally near the open end 50 of the slide mechanism 40. It should be appreciated that the depth of the exhaust slot 66 is a predetermined dimension that does not extend through to the front side 46 of the slide mechanism 40. The back side 48 of the slide mechanism 40 further includes a longitudinally extending detent override slot 68. The override slot 68 has a predetermined length, width and depth. An upper portion 68a of the override slot is positioned over the detent slot 62 on the front side 46 of the slide mechanism 40. A lower portion 68b of the override slot 68 does not extend all the way through the slide mechanism 40 to the front side 46. Therefore, where the detent slot 62 and upper portion 68a of the override slot 68 overlap, a continuous passageway is formed.

The lockout valve 10 further includes a detent mechanism 70 for overriding an intermediate position of the slide mechanism 40, thus allowing continuous movement between an open position and a closed position. The detent mechanism 70 includes a detent override lever 72 positioned partially inside the housing 14 and partially outside. Preferably, the detent override lever 72 is in the same plane as the slide mechanism 40. The detent override lever 72 includes a finger member 74 extending outwardly from the lever, and into the center of the housing 14. The housing 14 includes a recessed area 76 for receiving the detent mechanism 70. A spring member 78 and ball member 80 for the detent mechanism 70 are positioned in the recess 76 in the housing 14. The ball member 80 is positioned between the spring 78 and the detent override lever finger member 74. The spring 78 is preferably a compression spring, so as to hold the slide mechanism 40 in a closed position by forcing the ball 80 against the detent override finger 74.

In operating the valve 10, the ball 80 is initially located in the upper portion 62a of the detent slot 62 when the lockout valve 10 is in a closed position, as shown in FIGS. 1–4. If the user wants to go directly to the full open position of the valve 10, the slide 40 is pushed into the housing 14 until the flange 42 of the slide mechanism hits the housing 14, to open the valve 10. At the same time, the ball 80 travels in the detent slot 62 in the front side 46 of the slide mechanism 40 until it hits a bottom edge of the detent slot 62 as shown in FIGS. 5c and 5d at 82 in order to stop the sliding movement of the slide mechanism 40. It should be appreciated that the length of the detent slot 62 is determinable to allow the ball 80 to travel between the closed and the intermediate position of the slide mechanism 40.

Actuation of the detent override lever 72 causes an edge of the lever to hit an edge of the inside of the housing as shown at 84. Advantageously the detent override lever 72 can be actuated while pushing the slide 40 to avoid the intermediate position, or initially from the intermediate position. Actuation of the detent override lever 72 forces the override finger 74 up into the lower end 68b of the override slot 68 in the back side 48 of the slide mechanism, while lifting the ball out of the detent slot 62 and into the recessed area 76 of the housing 14, thus compressing the spring 78 and providing the ability to push the slide 40 all the way to the open position. To close the valve 10, the slide mechanism 40 is pushed from the open end 50 of the slide mechanism into the valve body 12, and the detent ball 80 falls into the detent slot 62 without any restriction. To position the valve 10 in an intermediate position, the slide mechanism 40 is pushed into the housing 14 until stopped by the detent mechanism 70 as shown in FIGS. 6–8. To position the valve 10 in closed position, the detent lever 72 is actuated as previously described.

It should be appreciated that in a closed position of the valve 10, fluid is blocked from passing between the inlet conduit 18 and the outlet conduit 20. Outlet fluid from the downstream system may be allowed to vent to atmosphere through the exhaust vent 26. In the intermediate position of the valve 10, fluid flow between the inlet conduit 18 and outlet conduit 20 is restricted, preferably until the pressure within the fluid system is equalized. In the open position of the valve 10, fluid flow between the inlet conduit 18 and outlet conduit 20 is not restricted.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A lockout valve comprising:

a valve body having a housing with an inlet conduit at one end of a central chamber and an outlet conduit at an other end of said central chamber, such that said inlet conduit, central chamber and outlet conduit form a continuous passageway, and a valve slide channel extending transversely therethrough said housing between an upper opening in an upper end of said housing and a lower opening in a lower end of said housing;

a slide mechanism slidingly disposed in said valve slide channel to operatively control fluid flow through said passageway between an open position, an intermediate position and a closed position, wherein said slide mechanism is generally planar and includes an upper end and a lower end each having a radially extending flange and two side edges extending therebetween said upper end and said lower end, and having a front side facing toward said inlet conduit and a back side facing toward said outlet conduit, and a plurality of flow apertures extending therethrough said slide mechanism and arranged in a predetermined pattern to restrict flow through said passageway in an intermediate position;

wherein said front side of said slide mechanism includes a detent slot having a predetermined length, width and depth, and said back side of said slide mechanism includes a longitudinally extending override slot having an upper portion with a first predetermined length, width and depth positioned opposite said detent slot to form a continuous opening through said slide mechanism, and having a lower portion with a second predetermined length, width and depth extending partially therethrough said slide mechanism; and a detent mechanism for overriding the intermediate position of said slide mechanism including a detent override lever partially disposed in said housing with a finger member extending from an edge of said detent override lever within said housing, a spring member located in a recess in said housing and a ball member located in the housing recess, such that the ball member is positioned between the spring and the detent override lever, wherein said ball is located in an upper portion of said detent slot when said slide mechanism is in a closed position and travels through said detent slot concurrent with said slide mechanism sliding through the valve slide channel until said ball reaches a bottom edge of the detent slot and actuation of said detent override lever engages said override finger within the lower end of said override slot to push said ball into the recessed area of said housing so that said slide mechanism bypasses the intermediate position.

2. The lockout valve of claim 1 wherein said inlet conduit and said outlet conduit each include a connecting means disposed on an outer end.

3. The lockout valve of claim 1 wherein said inlet conduit and said outlet conduit each include a sealing means operatively disposed on an inner end, respectively.

4. The lockout valve of claim 3 wherein said sealing means is an o-ring disposed in an annular channel formed in an inside surface of said housing about an inner end of said inlet conduit and an o-ring disposed in an annular channel formed in an inside surface of said housing about an inner end of said outlet conduit.

5. The lockout valve of claim 1 wherein said slide mechanism includes indicia on a front side or a back side of said slide mechanism indicating either one of an open position or a closed position of said valve.

6. The lockout valve of claim 1 wherein said slide mechanism includes a lockout aperture for preventing movement of said slide mechanism within said valve slide channel.

7. The lockout valve of claim 1 wherein said slide mechanism detent slot is centrally positioned between said upper end and said lower end, and adjacent a side edge, of said slide mechanism.

8. The lockout valve of claim 1 wherein an upper end of said back side of said slide mechanism includes a longitudinally extending exhaust slot having a predetermined length, width and depth that is adjacent a vent passageway in said valve housing when said slide mechanism is in a closed position.

9. The lockout valve of claim 1 wherein said detent ball slidingly travels from a lower end of said detent slot to an upper end of said detent slot as said slide mechanism slides through said valve slide channel between the open and closed position to stop fluid flow through the passageway.

10. The lockout valve of claim 1 wherein said detent ball slidingly travels through said detent slot until reaching an edge of the detent slot as said slide mechanism slides through said valve slide channel between either one of the open position or the closed position and the intermediate position, to restrict fluid flow through the passageway.

11. The lockout valve of claim 1 wherein said valve body includes two housing members joined together using a fastening means.

12. A lockout valve comprising:
a valve body having a housing with an inlet conduit at one end of a central chamber and an outlet conduit at an other end of said central chamber, such that said inlet conduit, central chamber and outlet conduit form a continuous passageway, wherein said inlet conduit and said outlet conduit each include a sealing means operatively disposed on an inner end respectively and said inlet conduit and said outlet conduit each include a connecting means disposed on an outer end respectively;
a valve slide channel within said housing and extending transversely therethrough said housing between an upper opening in an upper end of said housing and a lower opening in a lower end of said housing;
a slide mechanism slidingly disposed in said valve slide channel to operatively control fluid flow through said passageway between an open position, an intermediate position and a closed position, wherein said slide mechanism is generally planar and includes an upper end and a lower end each having a radially extending flange and two side edges extending therebetween said upper end and said lower end, and having a front side facing toward said inlet conduit and a back side facing toward said outlet conduit, and a plurality of flow apertures extending therethrough said slide mechanism and arranged in a predetermined pattern to restrict flow through said passageway in an intermediate position;
wherein said front side of said slide mechanism includes a detent slot having a predetermined length, width and depth and said back side of said slide mechanism includes a longitudinally extending override slot having an upper portion with a first predetermined length, width and depth positioned opposite said detent slot to form a continuous opening through said slide mechanism, and having a lower portion with a second predetermined length, width and depth extending partially through said slide mechanism; and
a detent mechanism for overriding the intermediate position of said slide mechanism including a detent override lever partially disposed in said housing with a finger member extending from an edge of said detent override lever within said housing, a spring member located in a recess in said housing and a ball member located in the housing recess, such that the ball member is positioned between the spring and the detent override lever, wherein said ball is located in an upper portion of said detent slot when said slide mechanism is in a closed position and travels through said detent slot concurrent with said slide mechanism sliding through the valve slide channel until said ball reaches a bottom edge of the detent slot, and actuation of said detent override lever engages said override finger within the lower end of said override slot to push said ball into the recessed area of the housing so that said slide mechanism bypasses the intermediate position and said detent ball slidingly travels from a lower end of said detent slot to an upper end of said detent slot as said slide mechanism slides through said valve slide channel between the open position and the closed position.

13. The lockout valve of claim 12 wherein said sealing means is an o-ring disposed in an annular channel formed in an inside surface of said housing about an inner end of said inlet conduit and an o-ring disposed in an annular channel formed in an inside surface of said housing about an inner end of said outlet conduit.

14. The lockout valve of claim 1 wherein said slide mechanism includes indicia on a front side or a back side of said slide channel indicating either one of an open position or a closed position of said valve.

15. The lockout valve of claim 12 wherein said slide mechanism includes a lockout aperture for preventing movement of said slide mechanism within said slide channel.

16. The lockout valve of claim 12 wherein said slide mechanism detent slot is centrally positioned between said upper end and said lower end, and adjacent a side edge, of said slide mechanism.

17. The lockout valve of claim 12 wherein an upper end of said back side of said slide mechanism includes a longitudinally extending exhaust slot having a predetermined length, width and depth that is adjacent a vent passageway in said valve housing when said slide mechanism is in a closed position.

18. The lockout valve of claim 12 wherein said detent ball slidingly travels through said detent slot until reaching an edge of the detent slot as said slide mechanism slides through said valve slide channel between either one of the open position or the closed position and the intermediate position, to restrict fluid flow through the passageway.

19. The lockout valve of claim 12 wherein said valve body includes two housing members joined together using a fastening means.

20. A lockout valve comprising:

a valve body having a housing with an inlet conduit at one end of a central chamber and an outlet conduit at an other end of said central chamber, such that said inlet conduit, central chamber and outlet conduit form a continuous passageway, wherein said inlet conduit and said outlet conduit each include a sealing means operatively disposed on an inner end respectively and said inlet conduit and said outlet conduit each include a connecting means disposed on an outer end respectively;

a valve slide channel within said housing and extending transversely therethrough said housing between an upper opening in an upper end of said housing and a lower opening in a lower end of said housing;

a slide mechanism slidingly disposed in said valve slide channel to operatively control fluid flow through said passageway between an open position, an intermediate position and a closed position, wherein said slide mechanism is generally planar and includes an upper end and a lower end each having a radially extending flange and two side edges extending therebetween said upper end and said lower end, and having a front side facing toward said inlet conduit and a back side facing toward said outlet conduit and a plurality of flow apertures extending therethrough said slide mechanism and arranged in a predetermined pattern to restrict flow through said passageway in an intermediate position, and a lockout aperture for preventing movement of said slide mechanism within said valve slide channel;

indicia on a front side or a back side of said slide mechanism indicating either one of an open position or a closed position of the valve;

wherein said front side of said slide mechanism includes a detent slot having a predetermined length, width and depth and said back side of said slide mechanism includes a longitudinally extending override slot having an upper portion with a first predetermined length, width and depth positioned opposite said detent slot to form a continuous opening through said slide mechanism, and having a lower portion with a second predetermined length, width and depth extending partially through said slide mechanism; and a detent mechanism for overriding the intermediate position of said slide mechanism including a detent override lever partially disposed in said housing with a finger member extending from an edge of said detent override lever within said housing, a spring member located in a recess in said housing and a ball member located in the housing recess, such that the ball member is positioned between the spring and the detent override finger, wherein said ball is located in an upper portion of said detent slot when said slide mechanism is in a closed position and travels through said detent slot concurrent with said slide mechanism sliding through the valve slide channel until said ball reaches a bottom edge of the detent slot, and actuation of said detent override lever engages said override finger within the lower end of said override slot to push said ball into the recessed area of the housing so that said slide mechanism bypasses the intermediate position and said detent ball slidingly travels from a lower end of said detent slot to an upper end of said detent slot as said slide mechanism slides through said valve slide channel between the open position and the closed position to stop fluid flow through the passageway and said detent ball slidingly travels through said detent slot until reaching an edge of the detent slot as said slide mechanism slides through said valve slide channel between either one of the open position or the closed position and the intermediate position, to restrict fluid flow through the passageway.

21. The lockout valve of claim 20 wherein said sealing means is an o-ring disposed in an annular channel formed in an inside surface of said housing about an inner end of said inlet conduit and an o-ring disposed in an annular channel formed in an inside surface of said housing about an inner end of said outlet conduit.

22. The lockout valve of claim 21 wherein said slide mechanism detent slot is centrally positioned between said upper end and said lower end, and adjacent a side edge, of said slide mechanism.

23. The lockout valve of claim 21 wherein an upper end of said back side of said slide mechanism includes a longitudinally extending exhaust slot having a predetermined length, width and depth that is adjacent a vent passageway in said valve housing when said slide mechanism is in a closed position.

24. The lockout valve of claim 21 wherein said valve body includes two housing members joined together using a fastening means.

* * * * *